(12) United States Patent
Koini et al.

(10) Patent No.: US 7,021,449 B2
(45) Date of Patent: Apr. 4, 2006

(54) METHOD AND APPARATUS FOR STORING TRAVEL LUGGAGE

(75) Inventors: Martin Koini, Soerth (DE); Gunar Baier, Mannheim (DE); Gunther Nagel, Graben-Neudorf (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/892,232

(22) Filed: Jul. 16, 2004

(65) Prior Publication Data
US 2005/0056576 A1    Mar. 17, 2005

(30) Foreign Application Priority Data
Jul. 17, 2003    (DE) ............................ 103 32 359

(51) Int. Cl.
*B65G 43/08*    (2006.01)
(52) U.S. Cl. ............... 198/358; 198/349; 198/347.1
(58) Field of Classification Search ........... 198/347.1, 198/347.2, 347.3, 347.4, 358, 349, 349.5, 198/349.6, 350
See application file for complete search history.

(56) References Cited
U.S. PATENT DOCUMENTS

| 3,610,159 | A | * | 10/1971 | Fickenscher ............... 198/349 |
| 3,915,284 | A | * | 10/1975 | Knockeart et al. ............ 198/349 |
| 5,413,205 | A | * | 5/1995 | Taylor et al. ................ 198/358 |
| 5,575,375 | A | * | 11/1996 | Sandusky et al. ............ 198/358 |
| 5,842,555 | A | * | 12/1998 | Gannon et al. ............. 198/358 |
| 6,311,822 | B1 | * | 11/2001 | LeCroy ....................... 198/358 |
| 6,789,660 | B1 | * | 9/2004 | Bruun et al. ............. 198/347.1 |

* cited by examiner

*Primary Examiner*—James R. Bidwell
(74) *Attorney, Agent, or Firm*—Buchanan Ingersoll PC

(57) ABSTRACT

The invention relates a method and a device for storing baggage delivered early, so-called early baggage, in traffic facilities, in particular commercial airports, which baggage is delivered to a check-in point a period, for example >2 h before the departure time of the respective transport vehicle, whereby this early baggage is being taken into storage until the time when it will be loaded into the respective transport vehicle by placing the baggage into a conveying system and storing it in this system in such a way that it can be removed from storage at any time and is brought via a removal station to the loading, whereby the early baggage is conveyed from the check-in point via a conveyor section of the conveying system to a special intermediate storage place and is handled there item by item mechanically and stacked in a space-saving manner at assigned intermediate storage places, the respective intermediate storage place for the respective baggage is recorded in an electronic data processing system, and the baggage items stored at the intermediate storage place are mechanically removed from the storage place when a predefined time is reached and are transported via the conveyor section to the normal loading process.

16 Claims, 2 Drawing Sheets

METHOD AND APPARATUS FOR STORING TRAVEL LUGGAGE

Figure 1:
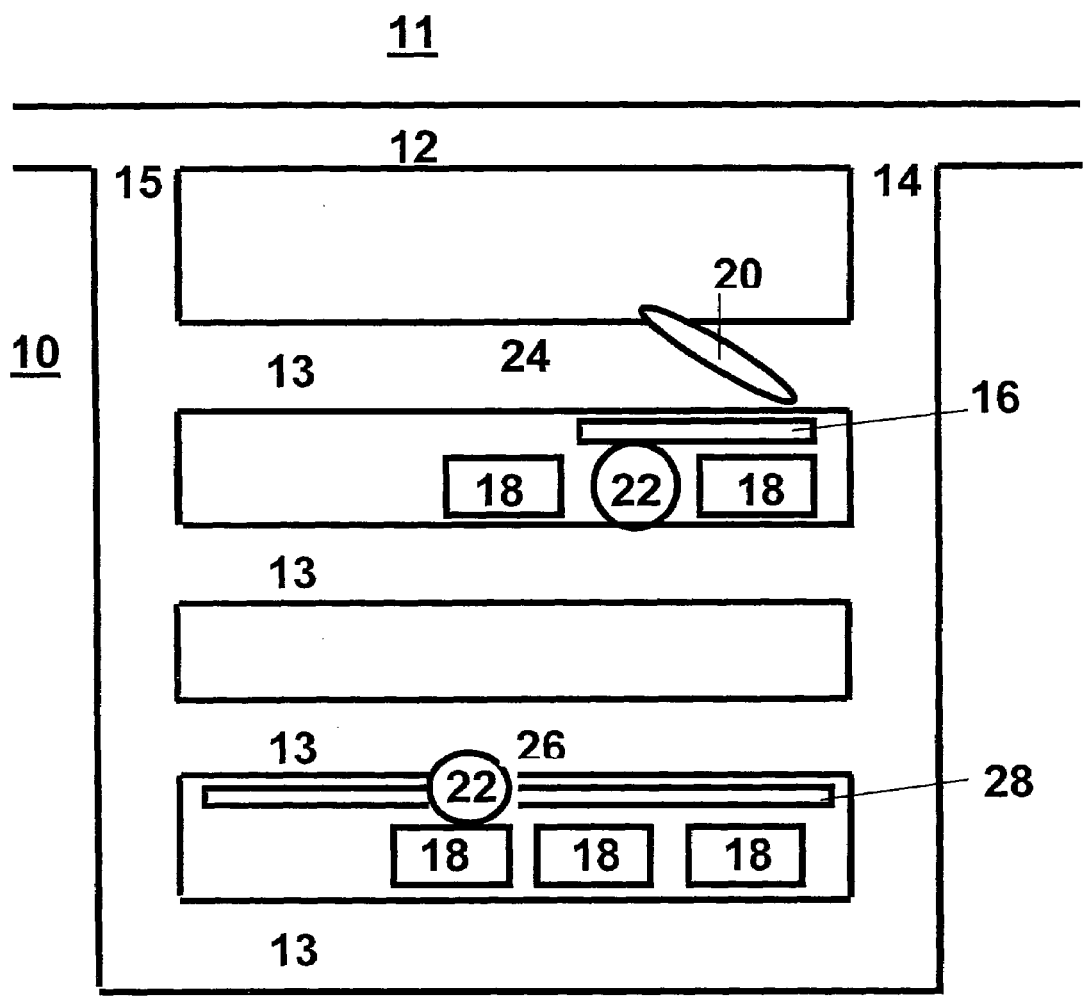

The invention relates to a method and a device for storing baggage delivered early, so-called early baggage, in traffic facilities, in particular commercial airports, which baggage is delivered to a check-in point a long time, for example >2 h, before the departure time of the respective transport vehicle, whereby this early baggage is being taken into storage until the time when it will be loaded into the respective transport vehicle by placing the baggage into a conveying system and storing it in this system in such a way that it can be removed from storage at any time and is brought via a removal station to the usual loading process into the respective transport vehicle, in particular an airplane.

In particular, the invention relates in essence to the automation of the baggage handling process in commercial airports for airline passengers with airline baggage, and hereby the handling of baggage items introduced "early" into the baggage handling system. "Early introduced baggage" or "early baggage" refers to baggage items for which the sorting, loading, and transport process for the respective transport vehicle, in particular an airplane, cannot be started yet at the time the baggage is delivered, so that the baggage items must be placed into intermediate storage over a certain time period in the baggage loading system.

In current baggage handling processes in commercial airports, the flight-related sorting and loading of the baggage items usually starts approximately 2 hours before flight departure. Baggage checked in by passengers before this time therefore must be placed into intermediate storage in the baggage handling system.

In addition, numerous airlines increasingly are offering their passengers to check in their baggage the day before. For this reason, the baggage handling system must be designed so that it allows storage or intermediate storage of the baggage for several hours to several days. In particular for larger commercial airports with high passenger volumes this means that sufficient storage capacity for up to several thousand items of baggage must be available in the baggage handling system.

In this context, it is, for example, generally known to store the early baggage in conveyor carts. The early baggage is hereby manually taken from the baggage handling system. The early baggage is hereby manually removed from the baggage handling system and placed into a storage area on conveyor carts. The disadvantage of this solution is that this requires, on the one hand, a substantial area and, on the other hand, both the manual removal and reintroduction of the early baggage into the baggage handling system, which is therefore very labor- and cost-intensive.

Another type of storage is the intermediate storage of the baggage on conveyor belts set up especially for the intermediate storage of the early baggage. An example of such a design is described in EP 0742163. The baggage is hereby separated out from the usual conveyor section of the baggage and undergoes intermediate storage on a conveyor belt constructed as an infinite loop until the respective baggage item can be loaded.

Even if it is possible to store several baggage items in such an arrangement on part of the conveying system, it is obvious that several hundred to several thousand baggage items require an enormous amount of conveying equipment, whereby an appropriately sized area also must be made available for this purpose.

Based on this state of the art it is the objective of the invention to disclose a method and a device of the initially mentioned type, which on the one hand takes into consideration the functional advantages of automated early baggage storage and on the other hand realizes early baggage storage with a substantially reduced requirement in surface area.

According to the invention, this objective is realized with the characterizing features of claims 1 and 7.

Accordingly, the method according to the invention is characterized in that the early baggage is conveyed from the check-in point via a conveyor section of the conveying system to an area intended for the intermediate storage of early baggage and is handled there item by item mechanically and stacked in a space-saving manner at assigned intermediate storage places, that the respective intermediate storage place and the respective baggage are recorded in an electronic data processing system, and that the early baggage items stored at the respective intermediate storage place are mechanically removed from the storage place when a predefined time is reached and are transported via the conveyor section to the normal loading process.

An essential element of the invention that should be emphasized is that the baggage items that were checked in early are stacked automatically at intermediate storage places, whereby these intermediate storage places are designed in such a manner that they can be emptied automatically, and the baggage items therefore can be reintroduced into the usual baggage handling process without manual interventions. The invention hereby represents a solution that enables a high baggage concentration in the space available for intermediate storage and that enables a fast reintroduction of the baggage for further processing. The invention is in particular characterized in that a clearly improved ratio between required area and baggage volume storable in this area is achieved.

According to an advantageous further development of the method according to the invention, it is provided that the early baggage is first conveyed via the conveyor section intended for the usual loading of the baggage to a removal point, from where it is conveyed to the intermediate storage place for early baggage, and that the respective baggage is identified when the predefined time is reached, is removed by mechanical means from the intermediate storage place, and is reintroduced into the conveyor section for the normal loading process.

According to another variation of the invention, a flight destination, flight class, and/or checking-in period is assigned by electronic data processing to the intermediate storage places, and the early baggage is sorted according to the assigned criteria and transported by means of a guide device to the intended intermediate storage place, and placed mechanically into storage at the intermediate storage place.

It may hereby be advantageous that after removal of the early baggage from the normal conveyor section, several conveyor sections are set up for conveying the early baggage items to their intermediate storage place, for example sorted by flight destination or checking-in time.

The early baggage to be stored is therefore transferred out via a conveyor section from the usual baggage handling system. The conveyor section hereby has one or more entrance or exit points that form the connection to the rest of the baggage handling system. Within the early baggage handling area formed in this way, it may be provided that the conveyor section branches out into several tracks so that the baggage items are guided into different areas of the early baggage storage according to their respective flight destination or intended checking-in period or according to the respective terminal or exit.

The conveyor section hereby has several transfer-out points along which the baggage items are passed. As soon as a baggage item has reached the storage area to which it was assigned, it is transferred out from the conveyor section. This is accomplished according to known methods according to the design of the conveyor section. In the case of belt conveyors, the transferring out is accomplished, for example, with gates or shunts; in the case of shell conveyors, for example, by tipping over the container shell.

After the transferring out, all baggage items that were assigned to this area of the early baggage storage are then placed into storage and stacked by way of an automated loading process as described, for example, in DE 199 34 095.

As soon as the time for further processing of the baggage (loading in containers or baggage carts for transport to the airplane) has come, the baggage stored at the intermediate storage place is loaded back onto the conveyor section in an automated manner and is returned by way of the conveying connection to the baggage handling system. The automated unloading is hereby accomplished with devices as described, for example, in DE 100 15 778.

In principle, the invention also provides for an advance loading of the baggage container, used in particular in airplanes, with the delivered early baggage, and placement of the baggage containers prepared for loading into the respective airplane with all their contained early baggage into intermediate storage so that the loading process, which is usually planned for a later time, can already be performed during intermediate storage. This only requires that at the time of the "preloading" of the baggage containers a sufficient volume of early baggage is available.

The method according to the invention hereby also provides that, if the early baggage at the intermediate storage place is presorted for a specific flight, low-traffic times before the actual scheduled departure time are used to perform the preloading of the containers and subsequent intermediate storage.

In general, a further improvement of the method according to the invention is characterized in that the monitoring and control of the equipment required for performing the method is accomplished by electronic data processing.

A device for performing the method previously described comprises an actually known conveying system for the mechanical transport of baggage items which is provided with at least one conveyor section designed for the standard transport of baggage as well as at least one each entrance point and removal point for baggage that are assigned to the first conveyor section, in particular for early baggage, whereby the early baggage is stored at an intermediate storage place. Such a device is known in particular from EP 07 42 163. The device for the intermediate storage of early baggage described in said document consists of a conveyor belt designed in the form of a meander-shaped infinite loop that is connected via discrete feed-in and feed-out points with the main conveying system. This means that if early baggage is delivered, it is placed onto the meander-shaped infinite conveyor belt and remains there until it is needed again for loading into the respective vehicle, i.e. the respective airplane. This type of intermediate storage necessarily requires extensive expenditure with respect to technical equipment for the baggage handling system and an enormous space requirement, whereby the time required for placing early baggage into storage or taking it out of storage is not even taken into consideration yet.

Based on this, it is the objective of the invention to create a device for intermediate storage of the previously mentioned type that requires the least space necessary, i.e. that a significantly larger volume of baggage can be accommodated on the available area in comparison with the known solution, whereby the time required for placing the baggage into storage or removing it from storage should be as short as possible.

According to the invention, this objective is realized according to claim 7 in that the conveyor section designed for the usual loading of the baggage is provided with at least one removal and introduction point, each of which is provided with a guide device that removes the early baggage from this conveyor section to the intended intermediate storage place or introduces it from the intended intermediate storage point to the intended loading onto the conveyor section provided for the usual loading of the baggage, and that mechanical means for handling each individual baggage item are provided at each intermediate storage place, which mechanical means grasp the respective baggage item and convey it from the conveyor section to the intended intermediate storage place for early baggage or which remove the early baggage from the intended intermediate storage place for early baggage and convey it onto the conveyor section.

In an advantageous further development of the invention it may be provided that the mechanical means provided for handling the early baggage at each intermediate storage place for early baggage are in each case constructed as robots that arrange the early baggage in stationary stacks, whereby the mechanical means used at each intermediate storage place are preferably multi-axle robots.

According to another preferred embodiment of the device according to the invention, at least two intermediate storage places are provided at which the baggage is stacked in stationary stacks. This means that, in contrast to the state of the art, the baggage items placed into intermediate storage remain at a spatially defined location to which they are transported according to the invention by using mechanical conveying means, such as robots and conveyor belt or so-called DCVs (destination-coded vehicles) and from which they are removed again in the same manner at a later time. The planned stacking of the early baggage with respect to destination and/or earliest loading time depending on scheduled departure time, guarantees a very quick conveyance of the early package from the intermediate storage into the main conveyance system and thus to loading.

According to a preferred embodiment of the device according to the invention, each intermediate storage place on the conveyance path is associated with a shunt-like guide device, whereby the latter either conducts the arriving baggage further on the conveyor section or separates it out for transport to the intended intermediate storage place, depending on its respective position.

In principle, according to the invention, the removal and introduction point from the standard baggage conveyance system can be constructed at the same location or at different locations. According to the first version, the removal and introduction point are used to both remove the early baggage from the standard conveyor section to the intermediate storage place as well as for introducing the early baggage from the intermediate storage place into the standard conveyor section to the removal point. The second version provides that the delivery of early baggage to the intermediate storage place on the one hand and the removal of the early baggage from the intermediate storage place into the usual conveying system takes place spatially separate from each other.

According to a preferred embodiment of the invention, it was found to be advantageous that after each introduction and removal point a branched conveying system is provided, through which the early baggage items are transported to the respectively intended intermediate storage places or, after the checking-in time is reached, are transported to the removal point in order to ensure that sufficient conveying capacity is available in accordance with the baggage volume to be conveyed.

The device according to the invention is furthermore characterized by a central unit of an electronic data processing system used for controlling and monitoring the operation of the conveying system, including its individual components, whereby it is preferred that all conveying means and guide devices used are connected with the central unit of the electronic data processing system, which initiates and controls their operation.

According to another advantageous design of the device according to the invention, all intermediate storage places are equipped with storage site monitoring modules that detect and display the degree of filling of the intermediate storage places with early baggage and their loading status in order to be able to maximize use of the storage capacity at the respective intermediate storage place.

It was hereby found to be particularly advantageous that each storage site monitoring module is connected with the central unit of the electronic data processing system and that this central unit controls the transport of early baggage to the respective intermediate storage place depending on the respective degree of filling and loading status of the intermediate storage places.

These and other advantageous embodiments of the invention are the subject matter of the claims.

Advantageous variations, improvements, and advantages of the invention will be explained in more detail using an exemplary embodiment of the invention shown in the enclosed drawing. In the process, the basic principle of the invention at hand shall be clarified once more and shall be explained in detail in reference to the exemplary embodiment.

In the drawings

Figure 2:
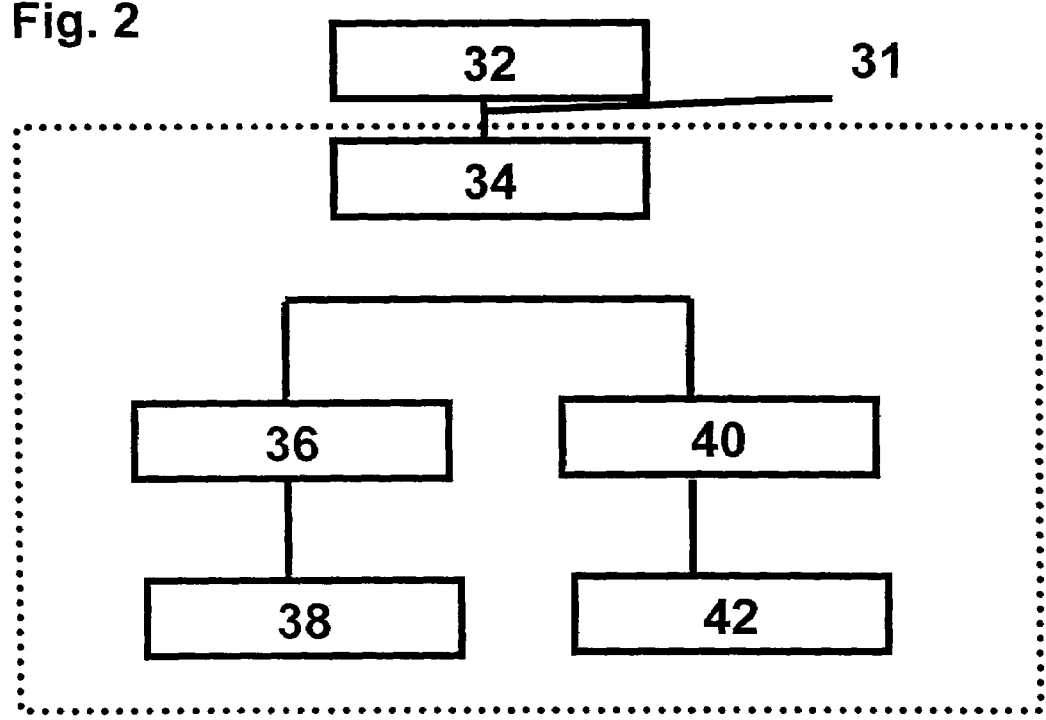

FIG. 1 shows a schematic illustration of an intermediate storage system for early baggage according to the invention, and FIG. 2 shows a schematic overview of the computer-based control and monitoring of the components provided for handling the intermediate storage system for early baggage.

FIG. 1 shows a schematic illustration of an intermediate storage place 10 for early baggage according to the invention, which is used in conjunction with the baggage handling system 11 of the commercial airport. Conveyor section 12 hereby represents a part of the baggage handling system 11 that conveys baggage from an entrance point to a removal point, neither one of which is shown here. In an embodiment, the conveyor sections are constructed as belt conveyors; however, other technologies such as shell conveyors or destination-coded vehicles (DCVs), etc., also can be used without any restrictions.

The feeding-in of the early baggage item from the conveyor section 12 into the early baggage storage system 10 according to the invention takes place via one or more introduction points 15. One or more removal points 14 are provided for returning the baggage items to the baggage conveying system. The exemplary embodiment only shows one each introduction point 15 and removal point 14 of these.

Within the intermediate storage or early baggage storage system 10, the conveying system branches into several tracks 13, which according to one embodiment are arranged parallel to each other. The intermediate storage places 18 of the storage system are located next to the tracks 13.

As soon as a baggage item has reached the intermediate storage place 18 to which it was assigned, it is transported by means of a transfer-out device 20 that may be constructed, for example, as a shunt or gate, to a take-off point 16. The shown embodiment (FIG. 1) is provided with a shunt 20 that swivels into the path of the conveyor section 13, forcing the baggage item to leave the conveyor section 13. There, a mechanical conveying mean 22, for example in the form of a multi-axle robot as known from DE 100 18 385 A1 or from DE 100 35 810 A1, takes the delivered baggage, without additional manual intervention, from the take-off point 16 and transports it to its predetermined intermediate storage place 18. In another embodiment, there is no transferring-out to a take-off point 16, and the transferring out takes place directly to the mechanical conveying mean 22.

If the baggage items are first loaded into transport troughs (not shown here), on which they are conveyed to the intermediate storage places 18, the transport troughs are unloaded using an appropriate tilt device (not shown here), and the baggage items are also taken up by the robot 22, as described above, and placed in stacks at the predetermined intermediate storage place. The automated unloading is hereby performed with a device as known, for example, from DE 100 15 778 A1.

FIG. 1 shows two possible embodiments for arranging the robots 22 used as a handling device. In a first area 24, the respective robot 22 is stationary, i.e. is placed in a spatially fixed manner between two intermediate storage places 18. Each of these embodiments is able to serve two intermediate storage places 18.

In a second area 26, the robot 22 is installed on a track 28 so as to be longitudinally movable. In this embodiment, several intermediate storage places 18 can be served consecutively with one robot 22 by moving the robot 22 on the track 28 to the respective intermediate storage place 18 where it puts items into storage.

Each intermediate storage place 18 is constructed so that a larger quantity of baggage items, for example 20–40 baggage items, can be stacked next to each other and on top of each other by using the robots 22. In an advantageous embodiment, the intermediate storage place 18 has several side limits (not shown here) for this purpose in order to prevent baggage from sliding out of the intermediate storage place 18.

This form of stacking and storing makes it possible that a substantially higher quantity of baggage items can be stored per area unit than would be possible according to EP 0 742 163.

The intermediate storage place 18 also has a monitoring device (also not shown in detail) that measures the actual contour of the deposited baggage. These data are used, among other things, to control the handling devices 22 in order to enable a safe and careful depositing of the baggage and to ensure that the intermediate storage places 18 are not overloaded.

As soon as the baggage placed into intermediate storage is retrieved from the early baggage storage 10 for further processing, the baggage is placed from the intermediate storage place 17 onto the conveyor section 13, and is transported from there via removal point 14 to the conveying system 12. For this purpose, the intermediate storage place 18 in one possible embodiment has a tilt device similar to the design described in DE 100 15 778, which empties the picked-up baggage 18 onto the conveyor section 13. In this case, the baggage is transported to and from the intermediate storage places using the same conveying elements 13.

In another, different design, the feeding-in and removal conveyor systems also may be constructed separate from each other. This second design on the one hand has the advantage that incoming and outgoing baggage is not able to collide on the conveyor section 13, but on the other hand has the disadvantage that it requires more conveying technology.

Since the placing of the baggage into storage additionally can be based on sorting criteria, such as flight destination or checking-in period, it is ensured that the baggage items can be removed specifically from the intermediate storage system 10 when released for further processing, without having to move other baggage items that have not been released yet. This procedure also makes it possible to easily take into consideration changes in the process, for example changes in departure time, with respect to the handling process, since in this case only the time of the release for removal for a specific intermediate storage place 18 must be managed, and not the much higher number of individual baggage items deposited there.

Where the realization of the method according to the invention with respect to control technology is concerned, another important component of the device is an early baggage management system 30 with computer. This computer, which may also be realized in the form of several computer systems, hereby comprises several functions:

Control of the individual subsystems

Coordination of the logistical sequences between the subsystems

Data management and data transfer with control of the baggage handling system 11

A preferred embodiment of the early baggage management system 30 is shown in FIG. 2, whereby other information technology designs are also possible within the meaning of the invention. However, the shown design has the advantage of modular construction, so that sub-functions can be easily modified and replaced without affecting overall functionality. This also enables a simpler integration in already existing computer systems in the airport or within the respective baggage system.

In the shown embodiment, the early baggage management system 30 is connected with the data processing system 32 of the baggage handling system 11 via a data interface 31. Via this data interface 31, the early baggage management system 30 receives the information about, for example, planned and actual checking-in times for pending flights, about the baggage items that are in the system and that are to be deposited in the early baggage storage 10, as well as any other required data.

Essential elements comprising the early baggage management system 30 include a storage management module 34, with which the packing of the individual intermediate storage places 18 is planned and managed, whereby the individual intermediate storage places 18 are assigned during defined time intervals to certain flights or certain checking-in periods.

According to the packing planning by the storage management module 34, the transport of the baggage items to be stored is controlled via a routing module 36. The latter plans and monitors the movement of the luggage items to the transfer-out points 20. The actual control of the conveying technology is hereby realized, for example, with a SPC (stored-program control) 38.

The storage place monitoring modules 40 are installed at each intermediate storage place 18 and monitor the filling degree and loading status of the storage places 18. These data are reported on the one hand to the storage management module 34 in order to inform this module about the current status of the filling degree, i.e. the still available loading capacity. On the other hand, a control module 42 for controlling the handling device 22 is receiving data, and in this way the further loading is controlled by, for example, determining the loading position for the next baggage item by using this control 42 for the handling device 22.

LIST OF REFERENCE NUMERALS

10 Early baggage storage system
11 Baggage handling system
12 Conveyor section
13 Conveyor sections/tracks in early baggage storage system 10
14 Removal point
15 Introduction point
16 Take-off point
18 Intermediate storage place
20 Transfer-out device, e.g. shunt, gate
22 Handling means, e.g. robots
24 First area
26 Second area
28 Track
30 Early baggage management system
31 Interface
32 Data processing system for 11
34 Storage management module
36 Routing module
40 Storage place monitoring module
42 Control of handling devices 22

The invention claimed is:

1. Device for performing a method for storing baggage delivered early, so-called early baggage, in traffic facilities, in particular commercial airports, which baggage is delivered to a check-in point a period, for example >2 h, before the departure time of the respective transport vehicle, whereby this baggage is being taken into storage until the time when it will be loaded into the respective transport vehicle by placing the baggage into a conveying system and storing it in this system in such a way that it can be removed from storage at any time and is brought via a removal station to the loading, wherein the early baggage is conveyed from the check-in point via a conveyor section of the conveying system to a special intermediate storage place and is handled there item by item mechanically and stacked in a space-saving manner at assigned intermediate storage places, that the respective intermediate storage place for the respective baggage is recorded in an electronic data processing system, and that the early baggage items stored at the intermediate storage place are mechanically removed from the storage place when a predefined time is reached and are transported via the conveyor section to the normal loading process, with a conveying system with at least one first conveyor section designed for the standard loading of baggage as well as at least one each entrance point and removal point for baggage that are assigned to the first conveyor section, in particular for early baggage, which early baggage is stored at an intermediate storage place, wherein the conveyor section designed for the usual loading of the baggage is provided with at least one removal and introduction point, each of which is provided with a guide device that removes the early baggage from this conveyor section to the respective intended intermediate storage place or introduces it from the intended intermediate storage point to the intended loading onto the conveyor section provided for the usual loading of the baggage, and that mechanical means for handling each individual baggage item are provided at each intermediate storage place, which mechanical means grasp the respective baggage item and convey it from the conveyor section to the intended intermediate storage place for early baggage or which remove the stored baggage from the intended intermediate storage place for early baggage and convey it onto the conveyor section.

2. Device according to claim 1, wherein the mechanical means for handling the early baggage provided at each intermediate storage place for early baggage are each constructed as robots that arrange the early baggage in stationary stacks.

3. Device according to claim 1, wherein the mechanical means used at each intermediate storage place are multi-axle robots.

4. Device according to claim 1, wherein the intermediate storage places are provided with a tilt device for removing the baggage items from the intermediate storage place to the conveyor section.

5. Device according to claim 1, wherein at least two intermediate storage places are provided at each of which the baggage is stacked in stationary stacks.

6. Device according to claim 1, wherein the guide device assigned to each introduction and removal point is constructed in the manner of a shunt and, depending on its respective position, guides the incoming baggage either to the conveyor section or removes it to the intermediate storage place.

7. Device according to claim 1, wherein between each introduction and removal point on the one hand and each intermediate storage place on the other hand, a second conveyor section is provided, through which the early baggage reaches an intermediate storage place that is located spatially separate from the conveyor section provided for the usual loading of the baggage.

8. Device according to claim 7, wherein the second conveyor section itself has at least one removal and introduction point provided with a guide device through which the early baggage reaches the intermediate storage place.

9. Device according to claim 1, wherein a central unit of an electronic data processing system is provided, which serves to control and monitor the operation of the conveying system, including its individual components.

10. Device according to claim 1, wherein all conveying means and guide devices used are connected with the central unit of the data processing system, which initiates and controls their operation.

11. Device according to claim 1, wherein all intermediate storage places are equipped with storage space monitoring modules that detect and display the degree of filling of the intermediate storage places with early baggage and their loading status in order to be able to maximize use of the storage capacity at the respective intermediate storage place.

12. Device according to claim 1, wherein each storage site monitoring module is connected with the central unit of the electronic data processing system and that this central unit controls the transport of early baggage to the respective intermediate storage place depending on the respective degree of filling and loading status of the intermediate storage places.

13. Device according to claim 1, wherein the removal points associated with the intermediate storage places are arranged spatially separate from the associated introduction points.

14. Device according to claim 1, wherein transport troughs for transporting the delivered early baggage are provided, in which troughs the early baggage is transported from the respective check-in point to the assigned intermediate storage places.

15. Device according to claim 1, wherein baggage containers adapted to the cargo space contour of certain transport vehicles, in particular airplanes, and are used for holding and transporting early baggage are used for loading at the intermediate storage places.

16. Device according to claim 15, wherein the baggage containers are preloaded with the early baggage delivered at the respective check-in point, whereby the delivered early baggage is transported from the respective check-in point to the assigned intermediate storage places in the baggage containers, and the baggage containers are used for intermediate storage of the early baggage at the respective intermediate storage places.

* * * * *